(12) United States Patent
Brahmanapalli

(10) Patent No.: US 9,152,313 B2
(45) Date of Patent: Oct. 6, 2015

(54) UNIFIED PICTURE ACCESS ACROSS DEVICES

(71) Applicant: Shutterfly, Inc., Redwood City, CA (US)

(72) Inventor: Syed Saleem Javid Brahmanapalli, Fremont, CA (US)

(73) Assignee: Shutterfly, Inc., Redwood City, CA (US)

( * ) Notice: Subject to any disclaimer, the term of this patent is extended or adjusted under 35 U.S.C. 154(b) by 106 days.

(21) Appl. No.: 13/911,468

(22) Filed: Jun. 6, 2013

(65) Prior Publication Data

US 2014/0040811 A1 Feb. 6, 2014

Related U.S. Application Data

(60) Provisional application No. 61/680,220, filed on Aug. 6, 2012.

(51) Int. Cl.
| | | |
|---|---|---|
| G06F 3/048 | (2013.01) | |
| G06F 3/0486 | (2013.01) | |
| G06Q 50/00 | (2012.01) | |
| G06F 17/30 | (2006.01) | |
| H04L 29/08 | (2006.01) | |

(52) U.S. Cl.
CPC .......... *G06F 3/0486* (2013.01); *G06F 17/3028* (2013.01); *G06F 17/30283* (2013.01); *G06Q 50/01* (2013.01); *H04L 67/1095* (2013.01)

(58) Field of Classification Search
CPC ....... G06F 3/0481; G06F 9/4443; G06F 5/14; G06F 3/0486; G06Q 50/01; H04L 67/1095
USPC .......................................................... 715/781
See application file for complete search history.

(56) References Cited

U.S. PATENT DOCUMENTS

| | | | |
|---|---|---|---|
| 7,010,600 B1* | 3/2006 | Prasad et al. ................... | 709/225 |
| 8,621,098 B2* | 12/2013 | Amento et al. ................ | 709/231 |
| 8,782,136 B1* | 7/2014 | Ho et al. ........................ | 709/204 |
| 8,798,401 B1* | 8/2014 | Johnson et al. ................ | 382/305 |
| 8,964,947 B1* | 2/2015 | Noolu et al. ................ | 379/88.01 |
| 2004/0017393 A1* | 1/2004 | Easwar ......................... | 345/744 |
| 2008/0085682 A1* | 4/2008 | Rao .............................. | 455/74 |
| 2010/0080412 A1* | 4/2010 | Zafar et al. .................... | 382/100 |
| 2010/0274858 A1* | 10/2010 | Lindberg et al. .............. | 709/206 |
| 2011/0165841 A1* | 7/2011 | Baek et al. .................... | 455/41.2 |
| 2012/0036483 A1* | 2/2012 | Soegtrop et al. .............. | 715/839 |
| 2012/0194741 A1* | 8/2012 | Hyun ............................ | 348/564 |
| 2012/0321192 A1* | 12/2012 | Marshall et al. .............. | 382/190 |
| 2012/0323891 A1* | 12/2012 | Jacobson et al. .............. | 707/722 |
| 2013/0223819 A1* | 8/2013 | Sims et al. .................... | 386/282 |
| 2013/0239049 A1* | 9/2013 | Perrodin et al. .............. | 715/800 |

(Continued)

*Primary Examiner* — David Phantana Angkool
(74) *Attorney, Agent, or Firm* — Xin Wen

(57) ABSTRACT

A method for creating a design for an image product includes registering a group of image sources by a network based image service system, wherein the group of image sources comprise a first device and a second device, receiving a notification, by the network based image service system, from the image sources about availabilities of the image sources, representing the second device and a local storage of the first device at a user interface on the first device, indicating an availability status of the second device on the first device, and if the availability status of the second device indicates that the second device is available, allowing a user to browse, on the first device, images stored on the second device.

17 Claims, 5 Drawing Sheets

(56) References Cited

U.S. PATENT DOCUMENTS

| | | | |
|---|---|---|---|
| 2013/0283142 A1* | 10/2013 | Farzin et al. | 715/224 |
| 2013/0328932 A1* | 12/2013 | Kim et al. | 345/636 |
| 2013/0332857 A1* | 12/2013 | Kim et al. | 715/753 |
| 2013/0346508 A1* | 12/2013 | Li et al. | 709/205 |
| 2014/0040775 A1* | 2/2014 | Stoop et al. | 715/753 |
| 2014/0050419 A1* | 2/2014 | Lerios et al. | 382/276 |
| 2014/0133782 A1* | 5/2014 | Asver et al. | 382/309 |
| 2014/0245173 A1* | 8/2014 | Knodt et al. | 715/748 |
| 2014/0304618 A1* | 10/2014 | Carriero et al. | 715/753 |

* cited by examiner

UNIFIED PICTURE ACCESS ACROSS DEVICES

BACKGROUND OF THE INVENTION

With the proliferation of digital devices, people can now acquire, edit, share, and organize photos on different devices, at and away from homes.

There is therefore a need to enable users to access and use all their photos on different devices.

SUMMARY OF THE INVENTION

The disclosed systems and methods provide a user convenient, ubiquitous, and seamless access of the user's photos on all her devices and in all her accounts, which can significantly save users' time spent on finding, transferring, staving, or organizing photos on multiple devices/accounts and on creating an image project.

A user can browse, view, select and use images from registered image sources as if they are on local memory or hard drives.

Moreover, the disclosed systems and methods provide a family or a group of user to conveniently user all their photos without the complications of multiple devices/accounts encountered by the current users.

In a general aspect, the present invention relates to a method for creating a design for an image product. The method includes: registering a group of computer devices by a network based image service system, wherein the group of computer devices comprise a first device and a second device; receiving a notification, by the network based image service system, from each of the computer devices in the group about availabilities of the computer devices; representing the second device and a local storage of the first device at a user interface on the first device; and allowing a user to browse, on the first device, images stored on the second device, which can include: requesting the second device to transfer thumbnail versions of the images to the network based image service system; transferring thumbnail versions of the images from the network based image service system to the first device; and displaying the thumbnail versions of the images at the user interface on the first device.

Implementations of the system may include one or more of the following. The method can further include indicating an availability status of the second device on the first device, wherein the user is allowed to browse, on the first device, images stored on the second device if the availability status of the second device indicates that the second device is available. The method can further include allowing the user to create an image project or a design of an image product using images stored at least in the first device and the second device. The method can further include allowing the user to select, on the first device, at least one of the images stored on the second device; requesting the second device to transfer a high-resolution version of the one of the images to the network based image service system; and transferring the high-resolution version of the one of the images from the network based image service system to the first device. The high-resolution version of the one of the images can include a full-resolution version of the one of the images. The method can further include displaying the high-resolution version of the images at the user interface on the first device. The method can further include storing the high-resolution version of the images in the local storage of the first device. The method can further include storing the high-resolution version of the images in the network based image service system. The step of registering a group of computer devices can include assigning each of the computer devices with a registration identification and authenticated token, wherein the first device and the second device communicate through the network based image service system based on authenticated tokens of the first device and the second device. The method can further include registering a cloud storage by the network based image service system; representing the cloud storage, the second device, and the local storage of the first device at the user interface on the first device; and allowing the user to browse, on the first device, images stored on the cloud storage, which can include: requesting the cloud storage to transfer thumbnail versions of the images to the network based image service system; transferring thumbnail versions of the images from the network based image service system to the first device; and displaying the thumbnail versions of the images at the user interface on the first device. The method can further include allowing the user to create an image project or a design of an image product using images stored at least in the first device and the cloud storage. The method can further include registering a user account at a social network by the network based image service system; representing the social network, the cloud storage, the second device, and the local storage of the first device at the user interface on the first device; and allowing the user to browse, on the first device, images stored on the social network, which can include: requesting the social network to transfer thumbnail versions of the images to the network based image service system; transferring thumbnail versions of the images from the network based image service system to the first device; and displaying the thumbnail versions of the images at the user interface on the first device. The method can further include allowing the user to create an image project or a design of an image product using images stored in at least the first device and the social network.

In another general aspect, the present invention relates to a method for creating a design for an image product. The method includes: registering a group of image sources by a network based image service system, wherein the group of image sources comprise a first device and a second device; receiving a notification, by the network based image service system, from the image sources about availabilities of the image sources; representing the second device and a local storage of the first device at a user interface on the first device; indicating an availability status of the second device on the first device; and if the availability status of the second device indicates that the second device is available, allowing a user to browse, on the first device, images stored on the second device, which can include requesting the second device to transfer thumbnail versions of the images to the network based image service system; transferring thumbnail versions of the images from the network based image service system to the first device; and displaying the thumbnail versions of the images at the user interface on the first device.

Implementations of the system may include one or more of the following. The method can further include allowing the user to create an image project or a design of an image product using images stored in at least the first device and the second device. The image sources can include a cloud storage or a social network. The method can further include registering the cloud storage or the social network by the network based image service system; representing the cloud storage or the social network, the second device, and the local storage of the first device at the user interface on the first device; and allowing the user to browse, on the first device, images stored on the cloud storage or the social network, which can include requesting the cloud storage or the social network to transfer thumbnail versions of the images to the network based image service system; transferring thumbnail versions of the images from the network based image service system to the first device; and displaying the thumbnail versions of the images at the user interface on the first device. The method can further include allowing the user to create an image project or a design of an image product using images stored in at least the cloud storage or the social network.

These and other aspects, their implementations and other features are described in detail in the drawings, the description and the claims.

Although the invention has been particularly shown and described with reference to multiple embodiments, it will be understood by persons skilled in the relevant art that various changes in form and details can be made therein without departing from the spirit and scope of the invention.

DETAILED DESCRIPTION OF THE INVENTION

Figure 1:
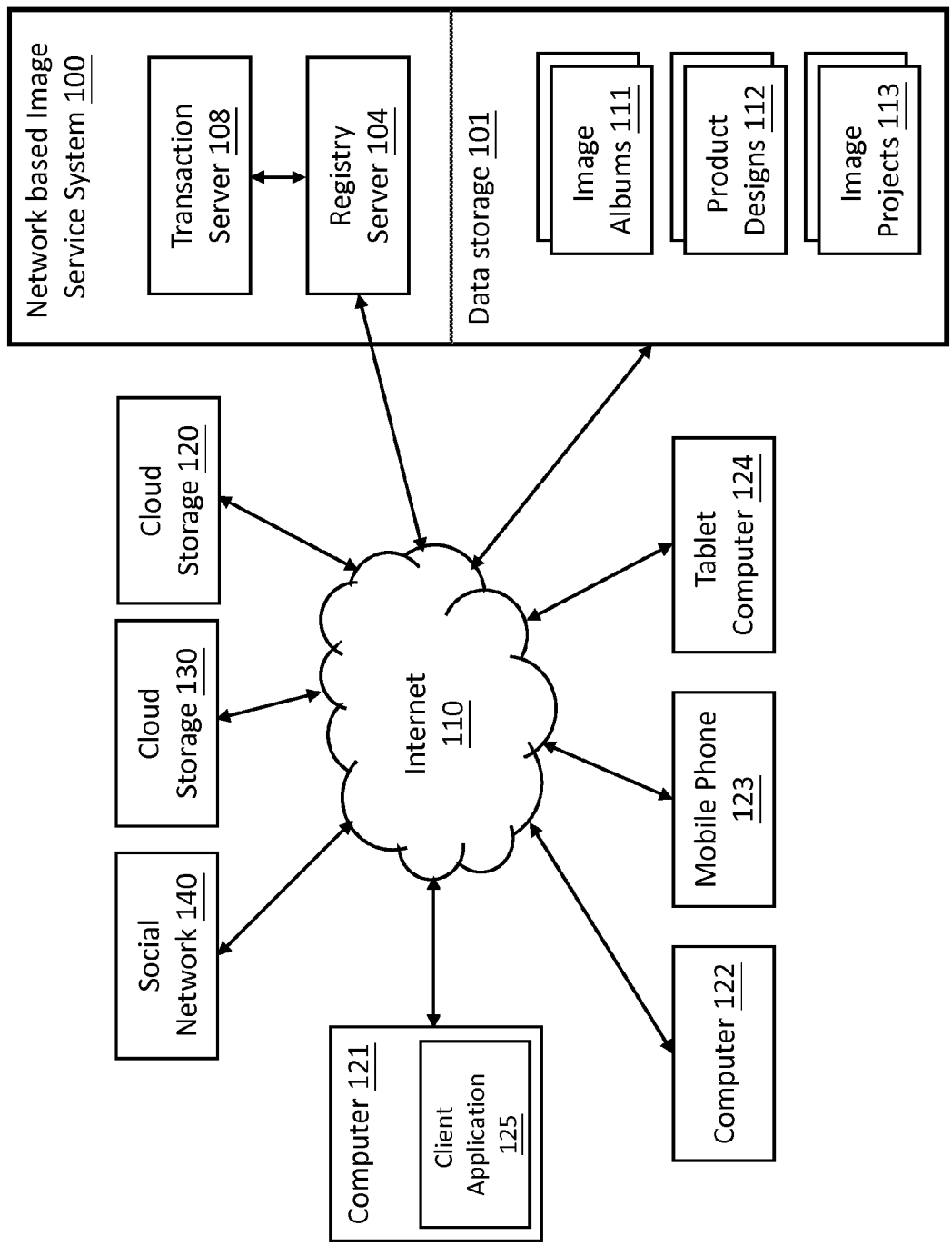
FIG. 1 is a block diagram for a network based system providing services for image sharing, image storage, and image project creation to a group of registered devices.

Referring to FIG. 1, a network based image service system 100 provides services for image sharing, image storage, and image project creation via wired or wireless networks over the Internet 110. The network based image service system 100 can be managed by a service provider such as Shutterfly, Inc. The network based image service system 100 can be in communication with a plurality of devices owned by a user or a user's family members such as a computer 121 (e.g. an iMac™), a computer 122 (Window™ based), a mobile phone 123 (e.g. an iPhone™, an Android™ phone, etc.), a tablet computer 124 (e.g. iPad™), or wearable devices (e.g. digital watch).

The network based image service system 100 can include a data storage 101, and can include or be in communication with a product fulfillment center. A user can upload images to the network based image service system 100. The images can be organized and stored in image albums 111. The network based image service system 100 also provides tools (such as a web interface or client application) to allow users to create image product designs 112 and image projects 113. The image products can be fulfilled for the users by fulfillment centers within or in connection to the network based image service system 100. Examples of image products include photobooks, photo cards and stationeries, photo calendars, photo gifts, photo collages, photo home decors, etc. Examples of the image projects 113 can include photo stories, photo slideshows, digital scrapbooks, virtual greeting cards, and videos produced from images.

The network based image service system 100 includes a registry server 104 and a transaction server 108. The registry server 104 is in communication with cloud storages 120, 130. The cloud storages 120, 130 can be enabled by the same service provider for the network based image service system 100, or a third party service provider such as Dropbox™, Carbonite™, and Amazon™. The cloud storages 120, 130 enable users to store and share files and folders across the Internet 110 using file synchronization. For example, the cloud storages 120, 130 can allow users to store and retrieve files from variety of desktop, laptop, and mobile devices such as the computers 121-122, the mobile phone 123, and the tablet computer 124.

The registry server 104 can also be in communication with a social network 140 (e.g. Facebook™). A user of the network based image service system 100 can also be a user of the social network 140. The user's account at the social network 140 can be registered at the network based image service system 100.

Conventionally, photos are captured by cameras and transferred to computers and then uploaded to the network based image service system 100. A major trend in digital imaging is that photos are captured and stored by an increasing number of smart devices such as the mobile phone 123, the tablet computer 124, or wearable devices, and received and stored at different sites such as the cloud storage 120, 130, and the social network 140 in addition to the computers 121, 122 and the network based image service system 100. As a result, managing and finding photos have become a difficult task.

In accordance with the present invention, to help a user to access and manage all her photos or photos taken by her family, the plurality of devices that a user or her family owns are registered at the network based image service system 100 such as Shutterfly, Inc. For example, the computers 121, 122, the mobile phone 123, and the tablet computer 124 can be registered in a registry to allow the network based image service system 100 to provide communications and facilitate data transfers among these devices.

Figure 2:
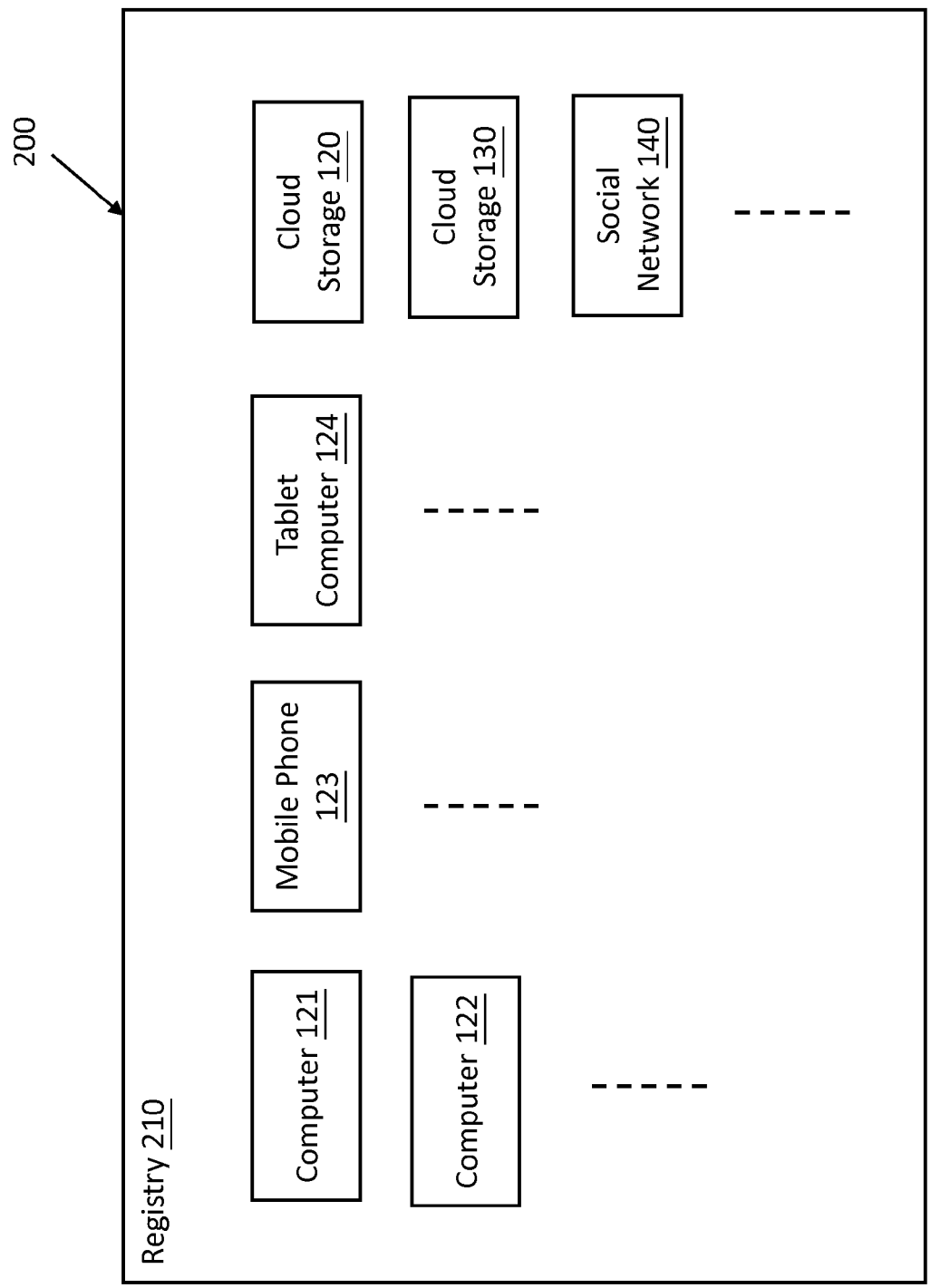
FIG. 2 illustrates a registry for registering a group of devices, cloud storage, and social network for one or a group of users.

Referring to FIG. 2, a user interface 200 can be implemented on the computers 121, 122, the mobile phone 123, and the tablet computer 124 to facilitate secure communications with the registry server 104 in the network based image service system 100. The user interface 200 can be implemented by a client application 125 in the computer 121, which includes a mobile application in the mobile phone 123 or the tablet computer 124. The user interface 200 allows a user to register the user's or her family's devices at the network based image service system 100. For example, the registry 210 can include the computers 121, 122, the mobile phone 123, and the tablet computer 124 as well as the user or her family's accounts at the cloud storages 120, 130 and the social network 140. The registry 210 can be private for the user or her family members or close friends.

In registrations, the client application 125 on the computer 121 or 122, the mobile phone 123, or the tablet computer 124 receives an authenticated token and a registration ID from the registry server 104 (FIG. 1). The communications and data transfer between the devices can be kept private by using secure protocols such as TCP and Http.

Once a device (or cloud storage or social network) is registered in a registry 210, whenever the device is on, the device can establish communications with the registry server 104 (FIG. 1) using its authenticated token and registration ID. The client application regularly or frequently sends notifications to the registry server 104 (FIG. 1) to inform that the device is on and is available for image data transfers. The availability status of the devices is represented and visible on a user's device, as shown in FIG. 3 and described below.

When user starts an image project 113 or product design 112 such as a photobook or a photo calendar at a registered device such as the computer 121, the user can incorporate images from the local drive or a plurality of registered devices or systems. The client application 125 on the device, the registry server 104 and the transaction server 108 (FIG. 1) allow the user to review and select images from the computer 121 as well as her or her family's other devices.

Figure 3:
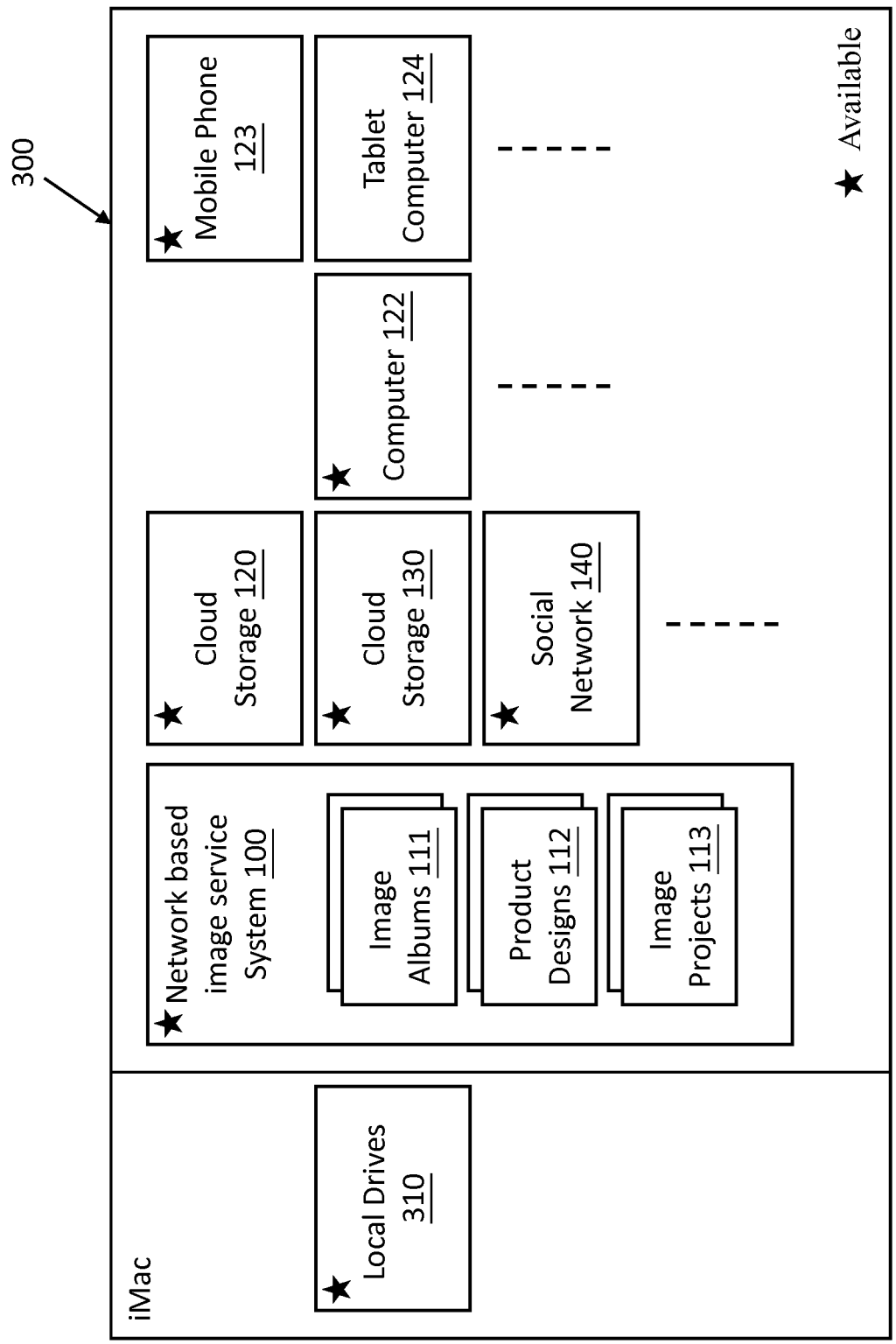
FIG. 3 illustrates a user interface at one of the registered devices, cloud storage, and social network to allow a user to view, pick, and use images from the group of devices and cloud storage.

Referring to FIG. 3, a user interface 300 is provided on the computer 121 (e.g. an iMac™) to enable the user to view and select photos stored on a local drive 310. The user interface 300 also allows the user to access the network based image service system 100 to retrieve and use some of the content in the image albums 111, image product designs 112, and image projects 113 for a new project. The user can start an image project on the computer 121 as described above, or retrieve and continue an unfinished image project 113 already stored in the user's account in the network based image service system 100.

In addition, referring to FIGS. 1 and 3, the user account at the network based image service system 100, the devices (122-124), cloud storages 120-130, user account in a social network 140 registered in the registry 210 are graphically represented at the user interface 300. Since the devices such as the computer 122, the mobile phone 123, the tablet computer 124, and cloud storages 120, 130, and the social network 140 are already registered, they can appear on the user interface 300 on the computer 121 just like the local diver 310. The availability status can be indicated by a solid full-color graphic symbol representing the respective devices, or by for example a star symbol next to the graphic symbol of the respective devices. If a registered device happens to be off or off line, that device can be shown in grey (or with the star symbol not shown) on the user interface 300 and the data in that device is temporarily not available.

The user can select one of the registered devices (e.g. the mobile phone 123) by clicking with a mouse, touching a touch sensitive screen, etc., to browse images in the selected device (e.g. the mobile phone 123). Upon receiving a browsing command from the computer 121, the registry server 104 notifies the transaction server 108. A transaction session is set up and a session ID is assigned. The transaction server 108 sends a request to the selected device (e.g. the mobile phone 123) to upload thumbnail images for the images and image folders to the transaction server 108, which are then sent to the client application 125 of the computer 121 via the registry sever 104. The thumbnail images are displayed at the user interface 300. When an image is clicked at the user interface 300 on the computer 121, a high resolution image can be uploaded from the selected registered device (e.g. the mobile phone 123) to the transactions server 108 and then downloaded to the computer 121. In the present disclosure a high resolution image refers to images in screen resolution or full (original) resolution. A thumbnail image is typically used as a small icon to graphically represent an image file.

Similarly, if a user selects cloud storage 120, 130 or a social network 140, file folders or image albums in the user's account on these systems will be downloaded to the transaction server 108 via a predetermined Application Programming Interface (API), and then made available to be shown at the user interface 300 on the computer 121.

As such, the user can browse and select photos from all registered devices at the user interface 300 on one of the registered devices. The user can drag and drop the selected photos from other devices into the computer 121 to incorporate into her image project. A similar user interface can be provided on other devices for the user or her family member to use all the photos stored in the network of devices and user accounts as registered in the registry 210.

The image project and the image product include images as well as design components such as text, image borders, image edit properties (e.g. cropping, color enhancement, image border, red-eye removal, image rotation, image background, embellishment . . . ). Examples of the image projects and image products include photobooks, greeting cards, photo calendars, stationeries, photo gifts, photo posters, photo collage, photo décor, etc. The metadata, tags, and keywords can include descriptors (occasions, events), image capture times, image upload times, image capture locations, image edit properties, image captions, image borders, access levels for different users (see details below) associated with the images, the product designs 112, and the image projects 113.

Once the design of an image project or an image product is created, the high resolution or full resolution versions of the images used in the design for the image project or the image product are transferred from the respective registered devices, the cloud storage 120, 130, or the social network 140 to the transaction servers 108 in the network based image service system 100. The full size images are then stored in the data storage 101.

The user can order an image product based on the image project from the network based image service system 100. The user can also share image project with others. The image project can be saved in the computer 121 or any other devices or accounts in the registry 210. The image project can also include a photo story, video, photo greeting cards, photo stationery, photo gifts, etc.

Figure 4:
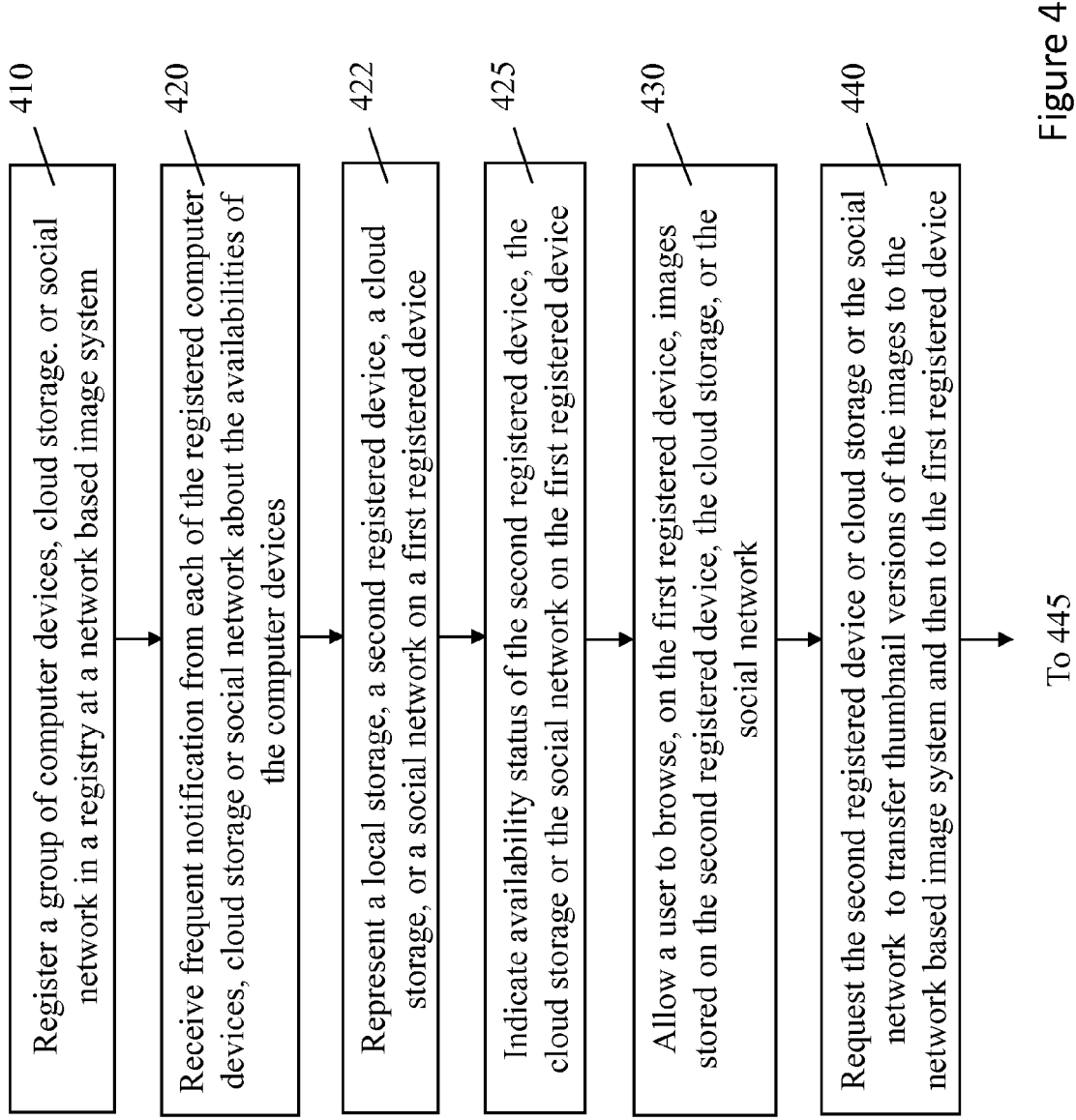
FIG. 4 is a flowchart to allow a user to view, pick, and use images from the group of devices, cloud storage, and social network.
Figure 4:
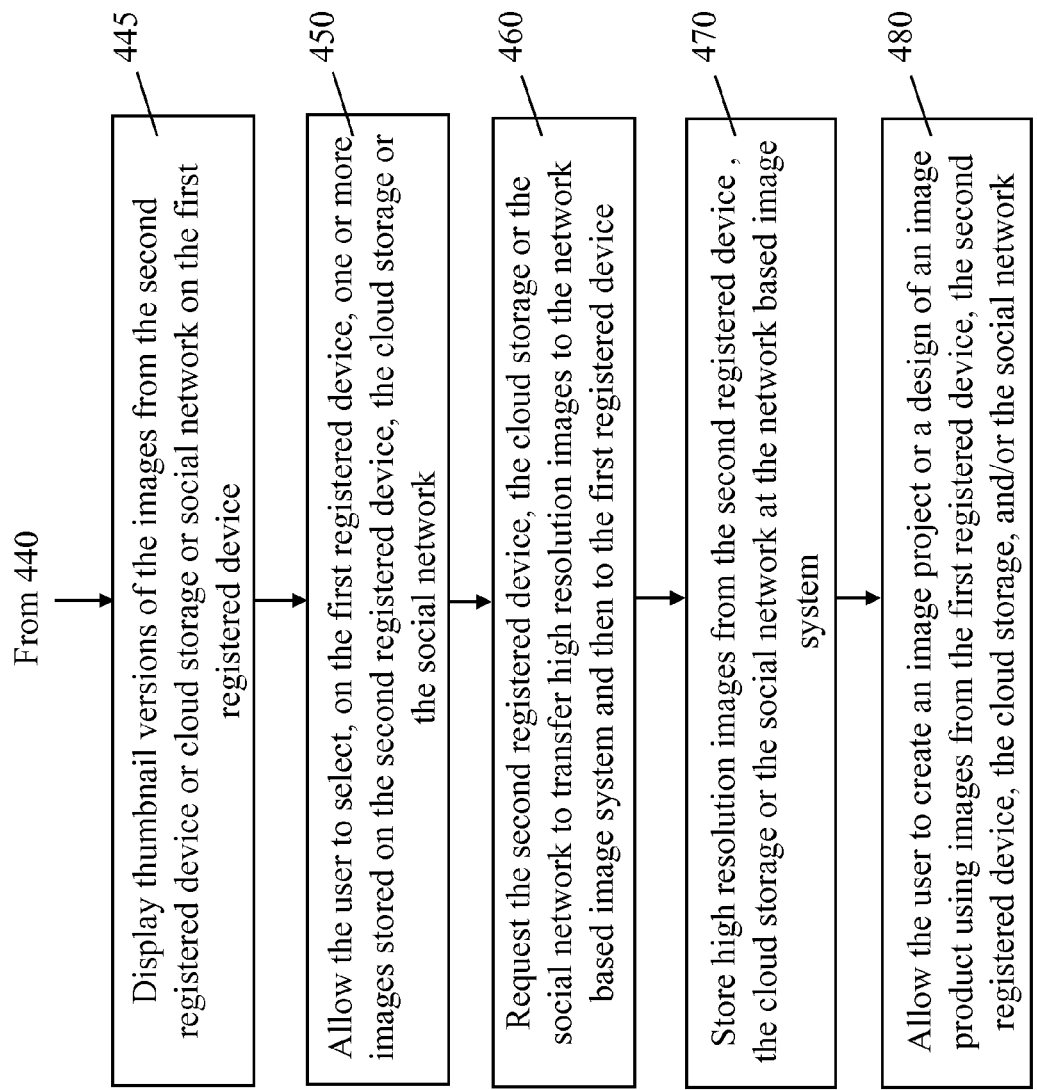

In accordance to the present disclosure, a client application on a registered device performs at least two important functions: first, providing secure communications between the registered device and the registry server; and secondly, upon receiving a request, uploading selected images from the registered device to the transaction server. Referring to FIG. 4, the process of selecting and acquiring images from a group of devices can include one or more of the following steps: a group of devices or systems (e.g. user accounts at cloud storage or a social network) that belong to one or more users are registered at a network-based system (step 410). The registration can involve assigning registration ID and authenticated token for each device, and authenticate user' accounts at the systems. The registrations are important to create secure and constant communications between the devices and systems such that users can view all image sources as if they are on local memory or local hard drives.

The network-based system frequently receives frequent notification from the registered devices and systems about the availability of the registered devices and systems (step 420). A local storage, one or more second registered devices, one or more cloud storages, and a social network are graphically represented on a first registered device (step 422). The availability status of the second registered devices, one or more cloud storages, and a social network are indicated on the first registered device (step 425). If the availability status of the second device or cloud storage or social network indicates that it is available, a user can command to browse, on the first registered device, images stored on a second registered device or system in the group of registered devices, cloud storage, or social network (step 430). The network-based system requests the second registered device, cloud storage, or social network to transfer thumbnail versions of the images to the network based image service system and then transfer the thumbnail images to the first registered device (step 440). The thumbnail versions of the images from the second registered device or cloud storage or social network are displayed on the first registered device (step 445).

The user is allowed to select, on the first registered device, one or more images on the second registered device, cloud storage, or social network (step 450). The network-based system then requests the second registered device or cloud storage or social network to transfer high resolution images to the network based image service system and then to transfer the thumbnail images to the first registered device (step 460) so that the high resolution images can be used in the design of the image project or image product. Optionally, the high resolution or full resolution versions of the images are displayed on the first registered device. After the image project or image product is created, the high resolution or full resolution versions of the images used are transferred from respective registered devices, cloud storage, or social network to be stored at the network based image service system (step 470) so that the full resolution images can be used for printing, sharing, etc. Optionally, the high resolution or full resolution versions of the images are stored on the first registered device. The user can create an image project or a design of an image product using images stored in the first device, the second device, the cloud storage, and/or the social network (step 480).

Benefits of the disclosed invention can include one or more of the following. The disclosed systems and methods provide a user convenient, ubiquitous, and seamless access of the user's photos on all her devices and in all her accounts, which can significantly save users' time spent on finding, transferring, staving, or organizing photos on multiple devices/accounts and on creating an image project.

Moreover, the disclosed systems and methods provide a family or a group of user to conveniently user all their photos without the complications of multiple devices/accounts encountered by the current users.

What is claimed is:

1. A method for creating a design for an image product, comprising:
    registering a group of computer devices by a network based image service system, wherein the group of computer devices comprise a first device and a second device;
    receiving a notification, by the network based image service system, from each of the computer devices in the group about availabilities of the computer devices;
    representing the second device and a local storage of the first device at a user interface on the first device;
    indicating availability status of the second device on the first device; and
    allowing a user to browse, on the first device, images stored on the second device, comprising:
        requesting the second device to transfer thumbnail versions of the images to the network based image service system;
        transferring thumbnail versions of the images from the network based image service system to the first device; and
        displaying the thumbnail versions of the images at the user interface on the first device,
        wherein the user is allowed to browse, on the first device, images stored on the second device if the availability status of the second device indicates that the second device is available.
2. The method of claim 1, further comprising:
    allowing the user to create an image project or a design of an image product using images stored at least in the first device and the second device.
3. The method of claim 1, further comprising:
    allowing the user to select, on the first device, at least one of the images stored on the second device;
    requesting the second device to transfer a high-resolution version of the one of the images to the network based image service system; and
    transferring the high-resolution version of the one of the images from the network based image service system to the first device.
4. The method of claim 3, wherein the high-resolution version of the one of the images includes a full-resolution version of the one of the images.
5. The method of claim 3, further comprising:
    displaying the high-resolution version of the images at the user interface on the first device.
6. The method of claim 3, further comprising:
    storing the high-resolution version of the images in the local storage of the first device.
7. The method of claim 3, further comprising:
    storing the high-resolution version of the images in the network based image service system.
8. The method of claim 1, wherein the step of registering a group of computer devices comprises assigning each of the computer devices with a registration identification and authenticated token, wherein the first device and the second device communicate through the network based image service system based on authenticated tokens of the first device and the second device.
9. The method of claim 1, further comprising:
    registering a cloud storage by the network based image service system;
    representing the cloud storage, the second device, and the local storage of the first device at the user interface on the first device; and
    allowing the user to browse, on the first device, images stored on the cloud storage, comprising:
        requesting the cloud storage to transfer thumbnail versions of the images to the network based image service system;
        transferring thumbnail versions of the images from the network based image service system to the first device; and
        displaying the thumbnail versions of the images at the user interface on the first device.
10. The method of claim 9, further comprising:
    allowing the user to create an image project or a design of an image product using images stored at least in the first device and the cloud storage.
11. The method of claim 1, further comprising:
    registering a user account at a social network by the network based image service system;
    representing the social network, the cloud storage, the second device, and the local storage of the first device at the user interface on the first device; and
    allowing the user to browse, on the first device, images stored on the social network, comprising:
        requesting the social network to transfer thumbnail versions of the images to the network based image service system;
        transferring thumbnail versions of the images from the network based image service system to the first device; and
        displaying the thumbnail versions of the images at the user interface on the first device.
12. The method of claim 11, further comprising:
    allowing the user to create an image project or a design of an image product using images stored in at least the first device and the social network.
13. A method for creating a design for an image product, comprising:

registering a group of image sources by a network based image service system, wherein the group of image sources comprise a first device and a second device;

receiving a notification, by the network based image service system, from the image sources about availabilities of the image sources;

representing the second device and a local storage of the first device at a user interface on the first device;

indicating an availability status of the second device on the first device; and if the availability status of the second device indicates that the second device is available, allowing a user to browse, on the first device, images stored on the second device, comprising:

requesting the second device to transfer thumbnail versions of the images to the network based image service system;

transferring thumbnail versions of the images from the network based image service system to the first device; and displaying the thumbnail versions of the images at the user interface on the first device.

14. The method of claim 13, further comprising:

allowing the user to create an image project or a design of an image product using images stored in at least the first device and the second device.

15. The method of claim 13, wherein the image sources include a cloud storage or a social network.

16. The method of claim 15, further comprising:

registering the cloud storage or the social network by the network based image service system;

representing the cloud storage or the social network, the second device, and the local storage of the first device at the user interface on the first device; and allowing the user to browse, on the first device, images stored on the cloud storage or the social network, comprising:

requesting the cloud storage or the social network to transfer thumbnail versions of the images to the network based image service system;

transferring thumbnail versions of the images from the network based image service system to the first device; and displaying the thumbnail versions of the images at the user interface on the first device.

17. The method of claim 15, further comprising:

allowing the user to create an image project or a design of an image product using images stored in at least the cloud storage or the social network.

\* \* \* \* \*